United States Patent [19]

Doenges

[11] Patent Number: 4,632,838
[45] Date of Patent: Dec. 30, 1986

[54] PROCESS FOR PREPARING FRENCH FRIED POTATO STRIPS

[75] Inventor: Michael G. Doenges, Newberg, Oreg.

[73] Assignee: Lamb-Weston, Inc., Portland, Oreg.

[21] Appl. No.: 767,791

[22] Filed: Aug. 20, 1985

[51] Int. Cl.$^4$ .............................................. A23L 1/217
[52] U.S. Cl. ..................................... 426/441; 426/438
[58] Field of Search ............... 426/438, 441, 637, 808, 426/444

[56] References Cited

U.S. PATENT DOCUMENTS

| | | | |
|---|---|---|---|
| 2,855,308 | 10/1958 | Buechele et al. | 426/438 |
| 3,397,993 | 8/1968 | Strong | 426/438 X |
| 3,644,129 | 2/1972 | Sloan | 426/444 X |
| 4,254,153 | 3/1981 | Ross et al. | 426/441 |
| 4,317,842 | 3/1982 | El-Hag et al. | 426/438 X |

FOREIGN PATENT DOCUMENTS

| | | | |
|---|---|---|---|
| 2359672 | 3/1975 | Fed. Rep. of Germany | 426/637 |
| 2078081 | 1/1982 | United Kingdom | 426/438 |
| 386619 | 10/1973 | U.S.S.R. | 426/637 |

*Primary Examiner*—Arthur L. Corbin
*Attorney, Agent, or Firm*—Klarquist, Sparkman, Campbell, Leigh & Whinston

[57] ABSTRACT

A method for making french fried potato strips includes peeling and cutting potatoes into raw potato strips. The potato strips are steamed, dried in ambient air, parfried, cool in cold air, parfried again and then frozen. In a modified form of the invention, the raw potato strips are blanched, cooled in cold air, blanched again, dried in ambient air, parfried, cooled in cold air, parfried again and then frozen. Time and temperature parameters of the steps can be varied to produce frozen potato strips having a relatively low solids content and improved quality or, alternatively, high quality frozen potato strips which can be finish fried in less than two minutes.

12 Claims, No Drawings

PROCESS FOR PREPARING FRENCH FRIED POTATO STRIPS

The present invention relates generally to food processing, and more particularly to a method for preparing french fried potato strips and the like.

BACKGROUND OF THE INVENTION

Most french fried potato strips (or so-called "french fries") consumed by consumers are prepared and sold by fast food restaurants. Most fast food restaurants (as well as many others) prepare french fries by frying frozen potato strips purchased from suppliers, with $\frac{1}{4}$ inch "shoe string" french fries being the most popular. Fast food restaurants typically "finish fry" frozen potato strips for about $2\frac{1}{4}$ to $2\frac{3}{4}$ minutes, and sometimes longer. The resulting french fries preferably have a solids content of about 55-60% by weight to provide the best flavor and texture.

Two common processes used in preparing french fries for fast food restaurants are disclosed in U.S. Pat. No. 3,397,993 to Strong and U.S. Pat. No. 3,649,305 to Wilder.

The Strong patent discloses a process in which raw potato strips are blanched until they become translucent throughout, dried in hot air at a temperature within the range of 150° F. to 350° F. for 5 to 20 minutes to cause a weight loss of at least 20%, parfried in oil at a temperature within the range of 300° F. to 375° F. for 15 to 60 seconds, and then frozen. The Strong patent indicates that the frozen strips may be reconstituted by frying them in oil at a temperature within the range of 300° F. to 375° F. for $1\frac{1}{2}$ to $3\frac{1}{2}$ minutes, although in each of the four examples provided, the frozen strips are finish fried for at least $2\frac{1}{2}$ minutes.

The Wilder patent discloses a process in which raw potato strips are dried in circulating air at a temperature within the range of 150° F. to 350° F. to cause a weight loss of 10% to 30%, blanched, parfried, cooled and then frozen. The patent indicates that the frozen strips may be reconstituted by frying them in oil at a temperature of about 325° F. to 375° F. for about $1\frac{1}{2}$ to 3 minutes, although the preferred frying time is indicated to be $2\frac{1}{4}$ minutes. No specific examples are provided.

Notwithstanding the foregoing processes, there is and has been a strong need, particularly in the fast food industry, for frozen french fries which can be prepared faster than those heretofore available. More specifically, there is a need for frozen potato strips which can be finish fried in less than two minutes without sacrificing product quality.

One of the main objectives of fast food restaurants is to serve customers as quickly as possible and yet still provide high quality food products. Because it takes about $2\frac{1}{2}$ minutes to finish fry frozen potato strips and additional preparation time once the resulting french fries are removed from the fryer, it is difficult for fast food restaurants to prepare french fries on demand without having customers wait for their orders. Thus, such restaurants are often forced to anticipate customer demand by frying batches of french fries ahead of time. However, it is difficult to anticipate precisely customer demand at any given time. If restaurant employees underestimate forthcoming customer demand, the customers may have to wait for their orders, possibly causing congestion or long lines at the counters where orders are taken and creating customer dissatisfaction. It is much preferable to serve customers at the counter immediately after their orders are taken to minimize congestion at the order counter or, alternatively, to avoid restaurant employees having to serve the customers at their tables. On the other hand, if restaurant employees overestimate forthcoming customer demand, the extra french fries must be stored under heat lamps until an order for french fries is placed or, if enough time passes, discarded because the quality of the product is less than satisfactory. Customers much prefer to have french fries served piping hot shortly after frying.

Thus, fast food and other restaurants need a frozen french fry product that can be prepared in less time than those products presently available without sacrificing product quality. A "short-refry" product would make it much easier for such restaurants to prepare french fries on demand, instead of ahead of time, thereby minimizing customer waiting time once the order is placed. It would also be much easier to serve french fries just out of the fryer to customers. Any prior attempts at developing a short-refry product to meet this need apparently have been unsuccessful in producing a product of comparable quality to conventional products (which are finish fried for over two minutes).

Additionally, there is and has been a strong need for "low solids" potato strips of improved quality. Most restaurants prefer frozen potato strips having a solids content of 36-40% by weight which, when finish fried for about $2\frac{1}{2}$ minutes, produce a final product having the desired solids content of about 55-60% by weight. However, some restaurants prefer frozen potato strips having a lower solids content of about 28-33% by weight. Such "low solids" potato strips can be prepared more easily, quickly and less expensively by the frozen potato strip supplier. However, when "low solids" potato strips are finish fried, again for about $2\frac{1}{2}$ minutes, they have a solids content toward the lower end and even below the preferred range of 55-60% and exhibit a flavor and texture somewhat less desirable than those prepared from frozen potato strips having a higher solids content. Thus, there is a need for a process for preparing "low solids" french fries having an improved quality which more closely corresponds to the quality of french fries prepared from frozen potato strips having a higher solids content.

Other processes for preparing potato products are identified below.

Chase U.S. Pat. No. 2,597,065 discloses a process in which potatoes are steamed, washed in cold water and then cut into strips. The potato strips are blanched, dried, cooled and then frozen. The frozen strips are reconstituted by finish frying them in oil at a temperature of 375° F. for about 3 minutes.

Buechele et al. U.S. Pat. No. 2,855,308 discloses a process in which potato pieces are first fried at a temperature of 350°-380° F., again fried at a temperature of 250°-300° F., and then frozen.

Vahlsing U.S. Pat. No. 3,175,914 discloses a process in which raw potato strips are blanched, washed in water, fried and then frozen. The frozen strips are reconstituted by finish frying.

McLaughlin et al. U.S. Pat. No. 3,355,299 discloses a process in which raw potato strips are water blanched, oil blanched and frozen. The frozen strips are subject to a three stage reconstitution, namely, frying for 3 to 5 minutes at 300° F. to 340° F., air cooling to reduce product temperature to at least 120° F., and then frying at 300° F. to 340° F. for $1\frac{1}{2}$ to 2 minutes.

Sloan U.S. Pat. No. 3,644,129 discloses a process in which raw potato pieces are blanched, cooled, blanched again, freeze dried and then air dried.

Weaver U.S. Pat. No. 3,934,046 discloses a process in which raw potato strips are parfried, leached in water, parfried, dried in hot air (in one embodiment) and then frozen. The frozen strips are finish fried in oil at a temperature of 365° F. for at least 2½ minutes.

Ross et al. U.S. Pat. No. 4,254,153 discloses a process in which raw potato strips are blanched, dried in fast moving ambient air for a period of time sufficient to cause a weight reduction of 8% to 15%, dried in circulating heated air to cause an additional weight reduction of 8% to 15%, parfried and then frozen. Two examples are provided, one in which the frozen strips are finish fried at 360° F. for 2¾ minutes and another in which the frozen strips are finish fried at 340° F. for 2¼ minutes, although it is generally indicated that the strips may be finish fried for about 1½ to 3½ minutes.

Wicklund et al. U.S. Pat. No. 4,277,510 discloses a process for preparing potato chips in which potatoes are peeled, blanched, and then sliced into chips. The chips are dried, steam blanched and fried.

European Patent Application 80302639.2, published Apr. 8, 1981, discloses a process in which raw potato strips are blanched, cooled, blanched again, starch coated, oil soaked, parfried, and then frozen. The frozen strips are reconstituted by oven heating.

It is therefore one object of the present invention to provide a process for preparing frozen french fried potato strips which can be prepared in less time than heretofore available products without sacrificing product quality.

Yet another object of the present invention is to provide a process for preparing frozen french fried potato strips as aforesaid having, upon reconstitution, a uniformly golden, desirably crisp outer surface, a mealy and cohesive potato interior, and a desirable flavor and texture.

Another object of the invention is to provide a process for preparing "low solids" frozen potato strips of improved quality.

A further object is to provide a process for preparing low solids frozen potato strips having, upon reconstitution, a uniformly golden, desirably crisp outer surface, a mealy and cohesive potato interior, and a desirable flavor and texture.

Another object of the invention is to provide a versatile process which can be used to prepare either low solids french fries or short-refry french fries merely by varying select time and temperature parameters of the process, thereby permitting a single production line to be easily used in the preparation of both products with minimal adjustment.

Other objects and advantages of the invention will become apparent from the following detailed description.

SUMMARY OF THE INVENTION

In accordance with the foregoing objects, the present invention comprises an improved process for preparing french fried potato strips and the like including the steps of peeling and cutting raw potatoes into strips. The strips are blanched, dried in ambient air, parfried, cooled in cold air, parfried again and then frozen. The frozen strips are reconstituted by oil frying.

The foregoing process can be further improved, whereby the raw potato strips are blanched, cooled in cold air, blanched again, dried in ambient air, parfried, cooled in cold air, parfried again and then frozen. The additional steps produce potato strips which have a slightly thicker outer surface crust and hold their firmness longer after reconstitution.

By varying only the time and temperature parameters of the foregoing processes, the following improved french fry products can be prepared:

(1) "low solids" french fries of improved quality;
(2) "normal solids" french fries of slightly improved quality; and
(3) short-refry french fries of comparable quality to french fries requiring longer refrying times.

DETAILED DESCRIPTION OF A PREFERRED EMBODIMENT

In accordance with the present invention, raw potatoes, preferably of the Russet-Burbank variety, are cleaned, peeled, trimmed and inspected for defects. The potatoes are cleaned using a water flume or spray, and then peeled in a conventional manner, using steam or caustic solution. The potatoes are then cut into sections suitably sized for french fried potato strips.

The potato strips are dipped in a flume containing about 0.75% sodium acid pyrophosphate, a preservative and color brightener, for about 20 seconds. Thereafter, the potato strips are blanched in water or steam at a temperature within the range of about 150° F. to 200° F. for about 1 to 10 minutes to gelatinize the potato cells. Preferably, the strips are blanched at about 190° F. for about 3 minutes. The blanching step improves the texture of the final product and reduces the amount of fat absorbed by the strips during later processing. It also inactivates enzymes which would otherwise cause oxidation and leaches natural sugars present in the strips, thereby giving the final reconstituted product a more uniform color and appearance.

The blanched strips are then dried in ambient air for about 5–12 minutes, preferably about 8½ minutes, to cause a moisture loss of about 8% to 12% by weight. This step removes surface moisture from the strips and slightly dehydrates potato cells near the surface, causing such potato cells to become thinly layered. Because no heat is applied to the strips, an equilibrium is maintained. The potato cells are free to expand or contract without distortion. Moisture is free to migrate within the strips. Moisture is not forced out of the potato cells, as when heat is applied. The ambient air drying step facilitates the development of potato strips having (when reconstituted) a thin, light, crisp surface texture, brighter color, and lower oil perception. The lower oil perception is due to the thinly layered potato cells near the surface, which inhibit fat absorption during subsequent frying steps, as well as to the blanching step which renders the potato cells less fat absorbent.

It has been found that a high temperature drying step, particularly for an extended period, can give the final product an undesirable surface texture. A long, high temperature drying step can cause the potato cells near the surface to become severely distorted and compacted, resulting in a tough, leathery surface texture.

The partially dried strips are parfried in hot oil at a temperature within the range of about 325° F. to 400° F. preferably about 370° F., for about 10–80 seconds. The parfried strips are then cooled in air at a temperature within the range of about 40° F. to 50° F. for about 5–15 minutes, preferably at about 45° F. for about 10 minutes. The cooled strips are then parfried again at a temperature within the range of about 325° F. to 400° F., preferably about 370° F., for about 10–80 seconds.

If the potato strips are intended to be of the "short-refry" type, both parfrying steps are carried out for about 55–80 seconds, preferably about 60 seconds. Strips which are parfried at about 370° F. for about 60 seconds, cooled at 45° F. for about 10 minutes, and parfried again at 370° F. for about 60 seconds will have an unusually high solids content of about 44–49%, preferably about 47%, by weight.

Alternatively, if the potato strips are intended to be of the "low solids" type, both parfrying steps are carried out for about 10–30 seconds, preferably about 25 seconds. Strips which are parfried at about 370° F. for about 25 seconds, cooled at 45° F. for about 10 minutes, and parfried again at about 370° F. for about 25 seconds will have a solids content of about 28–33%, preferably about 32%, by weight.

A more moderate solids content can be obtained by parfrying the strips (both times) for 30–50 seconds.

The parfrying steps increase the solids content of each potato strip by causing it to lose moisture and absorb oil. The air cooling step permits each strip to reach a state of equilibrium during which the potato starch retrogrades and moisture is able to migrate throughout the strip. This has the effect of developing a cohesive yet tender internal tissue which resists the formation of voids and separation of interior portions from the crisp outer skin during reconstitution. The fry-cool-fry sequence facilitates the development of a light, thin and crisp, yet tender surface texture by mildly compacting and layering the outer surface tissue of the strips. The sequence avoids excessive shrinking, compaction and distortion of the potato tissue which would otherwise occur with a single, long parfry step. It has been found that strips subject to a single, extended parfrying step tend to develop a hard, blistered surface crust of mottled color.

For purposes of storage and/or shipment, the strips are frozen in a conventional manner.

The frozen potato strips are reconstituted by finish frying them in oil at a temperature within the range of about 330° F. to 370° F., preferably at about 340° F. The low solids strips are preferably finish fried for about 2½ minutes. The short-refry strips, which have a much higher solids content, are finish fried for about 1½ minutes. In both cases, the final product has a solids content of about 53–60% by weight, including about 12–16% oils.

In accordance with a modified form of the present invention, potato strips are processed in the manner just described with two additional steps. In between the blanching and drying steps, the strips are cooled in air at a temperature within the range of about 40° F. to 50° F. for about 3–10 minutes and thereafter steam blanched at a temperature within the range of about 180° F. to 210° F. for about 1–5 minutes. Preferably, the strips are air cooled at a temperature of about 45° F. for about 5 minutes and thereafter steam blanched at about 200° F. for about 2½ minutes. Thus, the strips are subject to two blanching steps with a cooling step interposed therebetween.

The additional steps serve further to build the surface texture of the strips by causing the potato cells/tissue to expand, contract, and then expand again before being subject to the drying step. This creates a slightly thicker, crisper surface layer that holds its firmness longer. The subsequent drying, parfrying, cooling and parfrying steps maintain the tenderness of the strips and prevent them from becoming too tough.

EXAMPLE I

Russet-type potatoes were washed, peeled and sliced into 9/32 inch raw potato strips. The strips were dipped in a flume containing 0.75% sodium acid pyrophosphate for 20 seconds. Thereafter, the strips were steam blanched for 3¼ minutes at a temperature of 190° F. and then dried in ambient air for a period of time (about 8 minutes) sufficient to cause a moisture weight loss of about 8–10%. The dried strips were parfried in oil at a temperature of 370° F. for 53 seconds, air cooled at a temperature of 45° F. for 15 minutes and then again parfried in oil at a temperature of 370° F. for 53 seconds. The strips were subsequently frozen.

The frozen strips had an average solids content of 47.5%, by weight, including 14.1% oils. They were finish fried in oil at a temperature of 340° F. for 1½ minutes. Despite the short finish fry, the resulting french fries had uniformly golden, crisp yet tender outer surfaces and moist, mealy and cohesive potato interiors. They had an average solids content of about 54.7%, by weight, including 14.4% oils. The overall quality of the french fries compared very favorably to standard french fries requiring finish frying times over 2 minutes and had slightly moister, softer interiors than the latter.

EXAMPLE II

Russet-type potatoes were washed, peeled and sliced into 9/32 inch raw potato strips. The strips were dipped in a flume containing 0.75% sodium acid pyrophosphate for 20 seconds. Thereafter, the strips were steam blanched for 4½ minutes at a temperature of 190° F. and then dried in ambient air for 6 minutes to cause a moisture weight loss of about 9.6%. The dried strips were parfried in oil at a temperature of 370° F. for 15 seconds, air cooled at a temperature of 45° F. for 10 minutes, and then parfried again in oil at a temperature of 370° F. for 15 seconds. The strips were subsequently frozen.

The frozen strips had an average solids content of 31.6%, by weight, including 5.8% oils. They were finish fried in oil at a temperature of 340° F. for 2½ minutes. After reconstitution, they had an average solids content of 56.0%, including 15.8% oils. The resulting french fries, though of somewhat lesser overall quality than either those of Example I or standard french fries prepared from frozen potato strips having a higher solids content, exhibited a distinct improvement over prior comparable "low solids" french fries. They had uniformly golden, crisp yet tender exterior surfaces and moist, mealy interiors, and exhibited better holding characteristics after refry than comparable low solids products.

EXAMPLE III

Russet-type potatoes were washed, peeled and sliced into 9/32 inch raw potato strips. The strips were steam blanched at a temperature of 190° F. for 3 minutes and then dipped in a flume containing 0.75% sodium acid pyrophosphate for 20 seconds. The dipped strips were air cooled at a temperature of 45° F. for 5 minutes and then steam blanched again at a temperature of 190° F. for 1½ minutes. The blanched strips were dried in air for a period of time (about 8 minutes) sufficient to cause a moisture loss of 8–10% and then parfried in hot oil at a temperature of 370° F. for 50 seconds. The parfried strips were air cooled at a temperature of 45° F. for 15 minutes, then parfried again in oil at a temperature of 370° F. for 50 seconds, and then frozen.

The frozen strips had an average solids content of 48.5%, by weight, including 13.1% oils. They were reconstituted by finish frying in oil at a temperature of 340° F. for 1½ minutes. The resulting french fries had an average solids content of 55.8%, by weight, including 14.3% oils. They exhibited essentially the same charactertistics as the french fries of Example I, except for slightly thicker, crisper yet still tender outer surfaces. Like the french fries of Example I, they compared very favorably with standard fries requiring a longer finish fry.

EXAMPLE IV

French fries were prepared in accordance with the steps and parameters of Example III, except as noted. The 9/32 inch raw potato strips were dipped in a flume containing sodium acid pyrophosphate, steam blanched for 3 minutes (190° F.), cooled in cold air (45° F.), steam blanched again for 2 minutes (190° F.), dried in ambient air for 6 minutes to cause a moisture loss of 8.5%, parfried in oil for 15 seconds, cooled in cold air (45° F.) for 10 minutes, parfried again for 15 seconds, and finally frozen. The frozen strips had an average solids content of 31.8%, by weight, including 6.4% oils.

The frozen strips were finish fried in oil at a temperature of 340° F. for 2½ minutes. The resulting french fries had an average solids content of 51.9%, by weight, including 14.4% oils. They exhibited characteristics similar to those of Example II, except for a slightly thicker, crisper, more distinct outer surface. The overall quality was a significant improvement over prior low solids french fries.

Although the present invention can be used most advantageously to produce "low solids" frozen potato strips of markedly improved quality in comparison to prior comparable products or, alternatively, high quality, short-refry frozen potato strips, it can also be used to produce frozen potato strips having a solids content within the normal range of about 36–40% by parfrying the strips (both times) for moderate periods of about 30 to 55 seconds. When reconstituted, such "normal solids" french fries have a flavor, texture and product quality comparable to french fries presently served by fast food restaurants, except for a slightly more tender surface texture.

Having illustrated and described the principles involved in this invention by which the presently preferred embodiment and one suggested alternative, it should be apparent to those persons skilled in the art that such embodiments may be modified in arrangement and detail without departing from such principles. I claim as my invention all such modifications as come within the true spirit and scope of the invention as defined by the following claims.

I claim:

1. A method of preparing french fried potato strips suitable for finish frying comprising the steps of:
   cutting raw potatoes into strips;
   blanching the strips a first time to at least partially gelatinize the same;
   cooling the strips a first time;
   blanching the strips a second time;
   partially drying the strips in ambient air for a period of time sufficient to cause a weight loss of about 8 to 12%;
   parfrying the strips in oil a first time;
   cooling the strips a second time;
   parfrying the strips in oil a second time; and then freezing the strips.

2. The method according to claim 1 further comprising reconstituting the strips by frying them in oil at a temperature within the range of about 330° F. to 370° F. for less than 2 minutes.

3. The method according to claim 1 wherein the strips are blanched a first time at a temperature within the range of about 150° F. to 200° F. for about 1 to 10 minutes and blanched a second time at a temperature within the range of about 180° F. to 200° F. for about 1 to 10 minutes.

4. The method according to claim 3 wherein the strips are cooled the first time at a temperature within the range of about 40° F. to 50° F. for about 3 to 10 minutes.

5. The method according to claim 1 wherein the strips are cooled the first time at a temperature within the range of about 40° F. to 50° F. for about 3 to 10 minutes.

6. The method according to claim 1 wherein the strips are partially dried in ambient air for a period of time sufficient to cause a moisture loss of about 8 to 12% by weight.

7. The method according to claim 1 wherein the strips are parfried the first time and second time at a temperature within the range of about 325° F. to 400° F. for about 10–80 seconds.

8. The method according to claim 7 wherein the strips are cooled the second time in air at a temperature within the range of about 40° F. to 50° F. for about 5 to 15 minutes.

9. The method according to claim 1 wherein the strips are parfried both the first and second times at a temperature of about 370° F. for substantially equal periods of time sufficient to cause the strips to have a solids content of about 44–49% by weight.

10. The method according to claim 9 further comprising reconstituting the strips after freezing by frying them in oil at a temperature within the range of about 330°–370° F. for less than 2 minutes.

11. A method of preparing french fried potato strips suitable for finish frying comprising the steps of:
    cutting raw potatoes into strips;
    blanching the strips a first time at a temperature within the range of about 150° F. to 200° F. for about 1 to 10 minutes to at least partially gelatinize the same;
    cooling the strips a first time at a temperature of about 40° F. to 50° F.;
    blanching the strips a second time at a temperature within the range of about 180° F. for about 1 to 5 minutes;
    partially drying the strips in ambient air for a period of time sufficient to cause a moisture loss of about 8–12% by weight;
    parfrying the strips a first time at a temperature within the range of about 325° F. to 400° F. for about 10 to 30 seconds;
    cooling the strips in air at a temperature within the range of about 40° F. to 50° F. for about 5 to 15 minutes;
    parfrying the strips a second time at a temperature within the range of about 325° F. to 400° F. for about 10 to 30 seconds; and then
    freezing the strips.

12. The method of claim 11 further comprising reconstituting the frozen strips by frying them in oil at a temperature within the range of about 330° F. to 370° F. for about 2½ minutes.

* * * * *

UNITED STATES PATENT AND TRADEMARK OFFICE
CERTIFICATE OF CORRECTION

PATENT NO. : 4,632,838

DATED : December 30, 1986

INVENTOR(S) : MICHAEL G. DOENGES

It is certified that error appears in the above-identified patent and that said Letters Patent is hereby corrected as shown below:

In the Title Page:

Section [75], after "Michael G. Doenges," insert --904 Pioneer Lane,--.

In the Abstract:

Line 2, after "cutting" insert --whole--.

Line 4, "cool" should be --cooled--.

In the Claims:

Claim 11, column 8, line 49, after "180°F" insert --to 200°F--.

Signed and Sealed this

Twenty-fourth Day of March, 1987

Attest:

DONALD J. QUIGG

Attesting Officer     Commissioner of Patents and Trademarks